United States Patent [19]
Wanthal et al.

[11] Patent Number: 6,060,540
[45] Date of Patent: May 9, 2000

[54] MODELING PASTES

[75] Inventors: Mark A. Wanthal, Gillette, N.J.; Paul C. Paetzke, Belmont; Guy J. Stokes, Antioch, both of Calif.

[73] Assignee: Landec Corporation, Menlo Park, Calif.

[21] Appl. No.: 09/023,824

[22] Filed: Feb. 13, 1998

[51] Int. Cl.$^7$ .............................. C08K 3/40; C08L 63/02
[52] U.S. Cl. ........................................... 523/444; 525/114
[58] Field of Search .............................. 523/444; 525/114

[56] References Cited

U.S. PATENT DOCUMENTS

| | | | |
|---|---|---|---|
| 4,349,651 | 9/1982 | Smith | 526/263 |
| 4,358,571 | 11/1982 | Kaufman et al. | 525/524 |
| 4,420,605 | 12/1983 | Kaufman | 528/94 |
| 4,423,094 | 12/1983 | Dearlove et al. | 427/386 |
| 4,430,445 | 2/1984 | Miyake et al. | 521/38 |
| 4,528,305 | 7/1985 | Henry | 523/219 |
| 4,659,779 | 4/1987 | Bagga et al. | 525/118 |
| 4,689,388 | 8/1987 | Hirai et al. | 528/104 |
| 4,701,378 | 10/1987 | Bagga et al. | 428/414 |
| 4,732,962 | 3/1988 | Atkins et al. | 528/94 |
| 4,742,148 | 5/1988 | Lee et al. | 528/117 |
| 4,925,886 | 5/1990 | Atkins et al. | 523/443 |
| 4,933,392 | 6/1990 | Andrews et al. | 525/110 |
| 5,280,053 | 1/1994 | Dearlove et al. | 523/435 |
| 5,691,402 | 11/1997 | Anders | 523/515 |

FOREIGN PATENT DOCUMENTS

| | | |
|---|---|---|
| 0346809 A2 | 6/1989 | European Pat. Off. . |
| 0362787 A2 | 4/1990 | European Pat. Off. . |
| 0341210 B1 | 1/1993 | European Pat. Off. . |
| 0776917 A2 | 6/1997 | European Pat. Off. . |
| 40 40 432 A1 | 6/1992 | Germany . |
| WO 92/05216 | 4/1992 | WIPO . |
| WO 96/27641 | 9/1996 | WIPO . |
| WO 97/35900 | 10/1997 | WIPO . |

OTHER PUBLICATIONS

U.S. application No. 09/216,520, Bitler, filed Sep. 12, 1996.
The Role of Dispersed Phase Morphology on Toughening of Epoxies, Polymer 38 No. 1, 21–30 (1997), Qian et al.
Organic Microspheres for Supertough Syntactic Foams, Plastics Compounding, Mar./Apr. 1984, 19–27, Melber et al.
RTI Technical Bulletin, R–Tech 4505, Aug. 13, 1997.

*Primary Examiner*—Melvyn I. Marquis
*Assistant Examiner*—D. Aylward
*Attorney, Agent, or Firm*—Jeffrey G. Sheldon

[57] ABSTRACT

The present invention provides a modeling paste comprising a latent material which can be applied as a thick layer to a substrate and which after activation rapidly crosslinks to a machinable surface.

21 Claims, No Drawings

MODELING PASTES

BACKGROUND OF THE INVENTION

1. Field of the Invention

This invention relates to modeling pastes.

2. Introduction to the Invention

Model-making is an important industrial activity. For example, in the automotive, aerospace and other industries, it is necessary to produce prototype designs before committing to full-scale production. One long-established method of making such prototypes uses model (or styling) boards. Model boards are typically 50 to 100 mm (2–4 inch) thick and up to 1.5 m (60 inch) long, and are composed of a filled polymeric material which can be easily machined. A number of model boards (which may be preshaped) are joined together with adhesive to make a preform which has the same general shape as the model, but is somewhat larger, and which is machined into the desired model. Problems with this method include the need to maintain a large inventory of model boards, the wasteful use of modeling material, the weight of the model, and the presence on the model of bond lines and voids between model boards. In a second method, a curable modeling material is applied as a thick layer to a preform which has the same general shape as the model but is somewhat smaller, and is cured in place before being machined into the shape of the model. This second method poses very serious problems in formulating a modeling material which will remain in place on the preform while it is being cured. Attempts to overcome these problems have been expensive and only partially successful. In one such attempt, a thermosetting paste is prepared in a meter, mix and dispensing (MMD) machine, and is immediately applied to the preform. However, MMD machines are difficult and expensive to operate and maintain, particularly on the intermittent basis needed in model-making. Furthermore, MMD machines cannot mix pastes containing the high proportions of fillers which are desirable in order to control the slump of the paste after it has been applied to the preform and before it sets up. In a variation of this method, a modeling paste produced by an MMD machine is frozen in the form of a sheet and is applied to the preform at a later time. However, even when frozen, such sheets have a limited shelf life, and air often is trapped between adjacent sheets when they are applied to the preform.

Thermosetting epoxy resin systems, and other crosslinkable resin systems, are well known. It is known that in order to produce such a system which is relatively stable in storage, one of the active chemical moieties (e.g. a catalytic moiety or a reactive moiety) can be present in a "latent" form, which can be activated (by heating or otherwise) when rapid reaction is desired. Reference may be made for example to U.S. Pat. Nos. 4,349,651, 4,358,571, 4,420,605, 4.430,445, 4,659,779, 4,689,388, 4,701,378, 4,742,148 and 4,933,392 and European Patent Publication No. 362787A2. Commonly assigned U.S. application Ser. Nos. 08/726,739, abandoned 08/726,740 abandoned and 08/726,741 pending (each of which has been abandoned in favor of copending, commonly assigned, continuation-in-part application Ser. No. 09/216,520, and each of which was filed Oct. 15, 1996 and claims priority from U.S. application Ser. No. 08/399, 724 filed Mar. 7, 1995, now abandoned) and corresponding International Application No. PCT/US96/03023 (published Sep. 12, 1996, as International Publication No. WO-96/27641) disclose particularly valuable latent materials comprising an active chemical moiety which is bonded to a side chain crystalline (SCC) polymer or to another crystalline polymeric moiety which melts over a narrow temperature range. These latent materials, which are referred to in the applications as polymeric modifying agents, are preferably in the form of particles having an average size of 0.1 to 50 microns. Copending, commonly assigned U.S. application Ser. No. 08/710,161 (Docket No. 10762-4 filed Sep. 12, 1996), which has now been abandoned, also in favor of copending commonly assigned application Ser. No. 09/216, 520 referred to above, abandoned and corresponding International Application No. PCT/US 97/16019 (which was not published at the date of this application), but was published on Mar. 19, 1998, as International Publication No. WO 98/11166 disclose that even when there is no chemical bond between the active and polymeric moieties, a physical bond between the moieties can produce a lesser but still useful latent effect.

The disclosure of each of the U.S. patents and patent applications and International and European patent publications referred to in the preceding paragraph is incorporated herein by reference for all purposes.

SUMMARY OF THE INVENTION

We have discovered, in accordance with the present invention, that excellent modelling pastes can be prepared by making use of polymeric modifying agents of the kind disclosed in the copending commonly assigned U.S. applications referenced above and their International counterparts, and other latent materials.

In a first preferred aspect, this invention provides a modeling paste which can be applied to a substrate as a thick layer and then subjected to a treatment which cures the paste so that it forms a machinable layer on the substrate. The modeling paste comprises (1) a matrix material which
  (a) provides a continuous phase, and
  (b) comprises at least one precursor which will take part in a reaction to form a crosslinked polymer;

(2) a latent material which
  (a) is not part of the continuous phase, and
  (b) comprises an active chemical ingredient which will take part in the reaction to form a crosslinked polymer, and whose effective concentration is substantially increased by the treatment applied to the modeling paste;

(3) a filler; and (4) an elastomer which is not part of the continuous phase.

The term paste is used herein to denote a composition which can be applied (by hand or by means of a pump) as a thick layer to a shaped substrate and which will remain sufficiently in place while it sets up.

In a second preferred aspect, this invention provides a method of making a model which comprises (A) applying to a substrate a thick layer of a modeling paste according to the first aspect of the invention;

(B) subjecting the modeling paste to the treatment which causes it to cure as a thick machinable layer on the substrate; and (C) machining the cured layer into a desired shape.

DETAILED DESCRIPTION OF THE INVENTION

Matrix Materials

The invention is particularly useful for compositions which cure to form crosslinked epoxy resins, and is chiefly described by reference to such compositions. However, it is to be understood that the invention is also applicable to other curable resin systems.

Curable epoxy resin systems are well known. Generally they comprise an epoxy compound and an anhydride. For use in this invention preferred epoxy compounds are the glycidyl ethers of Bisphenol A and Bisphenol F. Other epoxy compounds which can be used include the glycidyl ethers of Bisphenol S and other polyhydric phenols (epoxy novalacs); glycidyl ethers of glycols; glycidyl amines, for example bis(epoxy propyl)aniline; glycidyl ethers of phenol and substituted phenols; glycidyl ethers of alcohols; and cycloaliphatic epoxy compounds, e.g. 3,4-epoxycyclohexylmethyl-3,4-epoxycyclohexane-carboxylate and bis(3,4-epoxycyclohexyl)adipate. Preferred anhydrides are methyl tetrahydrophthalic anhydride and dodecenylsuccinnic anyhydride. Others which can be used include hexahydrophthalic anhydride, phthalic anhydride, trimellitic anhydride, nadic methyl anhydride, methyl hexahydrophthalic anhydride, methyl-5-norbornene-2,3 dicarboxylic anhydride, chlorendic anhydride, polyazelic polyanhydride and polysebacic polyanhydride.

It is possible, though not preferred, to use an acidic material instead of, or in addition to, an anhydride, e.g. a carboxylic acid or a phenol. Suitable acidic materials include saturated and unsaturated multifunctional carboxylic acid curatives, e.g. isophthalic acid, phthalic acid, oxalic acid, amino benzoic acid, salicylic acid, chlorendic acid, di (propylene glycol dodecenyl succinate), and multifunctional phenolic compounds, e.g. resorcinol, cathecol, phlouroglucinol, Bisphenol A, Bisphenol F, and phenol novolac resins.

The stoichiometric ratio of epoxy compound to anhydride (and/or acidic material) is generally about 1:1.

Elastomers

The modeling paste contains an elastomer which is at least partially insoluble in the continuous phase of the modeling paste. The elastomer plays an important role in imparting toughness or flexibility to the crosslinked polymer, particularly in offsetting the brittle nature of cured epoxy resins resulting from catalyst-accelerated epoxy-anhydride or epoxy-acid reactions carried out at convenient and practical low temperature cure schedules. The elastomer influences the machinability and the tolerance of the cured material to resist the stresses induced by (a) shrinkage of the resin as it cures, and/or (b) by differences in thermal expansion and contraction between the modeling paste and the substrate to which it is applied. For example, aluminum substrates are often used, and a practical modeling paste must withstand being cured on an aluminum support that will contract to a greater degree than the paste as the assembly is cooled from the cure temperature to ambient conditions.

Examples of suitable elastomers include elastomers containing butadiene and polymethyl methacrylate (e.g. Paraloid EXL-2691 and EXL-2330 from Rohm & Haas), carboxylic acid-terminated butadiene/acrylonitrile rubbers, acrylonitrile/butadiene/styrene terpolymers (e.g., Blendex B-360 or B-338 from General Electric), urethane elastomers, acrylate elastomers, maleic anhydride/butadiene copolymers, polyoxyalkyleneamines and their epoxy adducts, dimer and trimer acids, and diols and triols such as caprolactone diols and propyleneoxide triols, and polypropylene glycols.

An insoluble elastomer component provides the benefit of toughening and improvements to stress cracking and machining without decreasing the cross-link density of the resin/anhydride mixture. If all or part of the elastomer is dissolved in the continuous phase of the matrix, this makes it more difficult to achieve a complete cure in realistic times at lower cure temperatures. Through the use of a completely insoluble elastomer, a complete cure is not impeded. Thus an insoluble elastomer modifies the machinability and stress tolerance without adversely affecting the cure kinetics.

At least part of the elastomer must be in a non-continuous phase in the modeling composition both before and after the composition has been cured. Preferably the elastomer is substantially insoluble in any of the other ingredients of the composition. However, it can be partially or completely soluble in another ingredient which is not part of a continuous phase, or it can be partially soluble in an ingredient which provides a continuous phase. Preferred elastomers are substantially insoluble in the continuous phase in the curable modeling composition, but can be readily dispersed in the continuous phase. If extensive milling is needed to disperse the elastomer, this tends to solubilize the elastomer in the continuous phase. Because smaller particles are more easily dispersed, the elastomer preferably has an average particle size of less than 500 microns, particularly less than 300 microns. To the extent, if any, that the elastomer is soluble in the continuous phase, it tends to slow down the rate of cure. Preferred elastomers for use in the present invention, particularly when the composition comprises precursors which form a crosslinked epoxy resin, are (1) core-shell rubbers, which comprise a core of an elastomer, e.g. a butadiene/styrene copolymer, covered by a shell of another amorphous polymer, particularly a polyacrylate, which may be grafted to the elastomer; and (2) elastomers comprising units derived from butadiene, styrene and acrylonitrile.

Latent Materials

At least one of the ingredients which takes part in the reaction which forms the crosslinked polymer is present in the modeling paste as a latent material. This ensures that the reaction does not take place, or takes place at a relatively slow rate during mixing of the ingredients of the modeling paste and during storage. Preferably the modeling paste can be stored at room temperature for at least 30 days, particularly at least 60 days, without increasing in viscosity to an extent such that it cannot be applied to the substrate. At the time of use, the modeling paste is subjected to a treatment which activates the latent ingredient, i.e. which increases its effective concentration in the reaction. The treatment can be carried out just before, and/or during, and/or just after, application of the modeling paste to the substrate. The treatment generally involves heating the modeling paste, but other treatments can alternatively or additionally be used.

The amount and type of latent material should be selected to provide a desired balance between (a) stability during mixing of the ingredients and during storage, and (b) a rapid increase in viscosity after the paste has been applied to the substrate. Preferably the latent material is substantially non-reactive at room temperature, so that a relatively large quantity of it can be included in the paste, resulting in a high concentration of the latent ingredient after activation (and consequently a rapid crosslinking reaction).

The ingredient which results from activation of the latent material can be a catalyst which takes part in the reaction and is regenerated to catalyze further reaction and/or a reactant which becomes chemically bound in the crosslinked polymer. Particularly useful latent materials (a) comprise
 (i) a polymeric ingredient which comprises a crystalline polymeric moiety, preferably a side chain crystalline (SCC) polymeric moiety, having an onset of melting temperature $T_o$ and a peak melting temperature $T_p$ such that $T_p-T_o$ is less than $T_p^{0.7}$, preferably less than 10° C., and (ii) the active chemical ingredient, and (b) are in the form of solid particles which have an average particle size of 0.1 to 150, preferably 0.1 to 50, microns and which, during said treatment, undergo a physical change which causes the particles to lose their physical integrity, and increases the extent to which the matrix material is contacted by the active chemical ingredient.

The polymeric ingredient and the active chemical ingredient are preferably bonded to each other through a covalent bond having a strength of at least 10 Kcal/mole. Preferably the treatment which cures the layer of modeling paste increases the concentration of the active chemical ingredient in the reaction by a factor of at least 500, particularly at least 1,000, especially at least 2,000. Latent materials of this kind are disclosed for example in International Publication No. WO-96/27641. Other latent materials are well known, and are described for example in the documents incorporated herein by reference.

For the epoxy-containing pastes which are preferred in this invention, the latent material preferably provides, when activated, an ingredient which is a nitrogen-containing compound, or a metal-containing compound, or a metal. Examples of such nitrogen- containing ingredients include tertiary amines, imidazoles, quaternary amine salts, dicyandiamide, modified dicyandiamide, e.g. alkyl-substituted dicyandiamides, hydrazides, cyclic amidines, benzyl trimethyl ammonium chloride, 2-benzathiaxolyl disulfides, and the nitrogen-containing compounds resulting from the thermal decomposition of isocyanate adducts of aliphatic amines, e.g. the adducts of dimethylamine and toluene diisocyanate or phenyl isocyanate. Commercially available latent materials which provide such ingredients include the products sold under the trade names Intelimer 7002, Intelimer 7004, Intelimer 7024, Ancamine 2014AS, Ancamine 2014FG, Ancamine 2441, Ajicure MY-24, Ajicure PN-23, Ajicure MY-H, Curezol 2MA-OK, Curezol 2MZ-Azine, Curezol 2PHZ-S, Curezol C17Z, and Curezol 2PZ. Examples of metal-containing compounds include chromium (III) complexes and stannous octoate.

Fillers

The modeling paste contains one or more fillers selected so that the paste has a consistency suitable for application to the substrate as a thick layer and provides a cured composition which can be easily machined to provide a having a small quality. Fillers having a small particle size are preferred to maximize surface smoothness. Preferably, the filler does not react chemically which any of the other ingredients of the composition.

Fillers in the form of microspheres are particularly useful because they reduce the density of the composition and the amount of heat generated by the curing reaction for a given volume of the composition. Inorganic and/or polymeric microspheres can be used. Microspheres of glass and other inorganic materials help to produce cured compositions having a low coefficient of thermal expansion. Polymeric microspheres help to improve paste processing characteristics and machineability of the cured compositions. In many cases, a mixture of more than one glass, ceramic, thermoplastic, and thermoset plastic microspheres is utilized to obtain a desired balance of density and other properties. Examples of glass microspheres include those made of soda lime borosilicate glass such as Scotchlite K-1, S-15 and K-20 from 3M Corporation. Examples of ceramic microspheres include fly ash microspheres such as Zeospheres from 3M Corporation and Bubble Alundum ceramic microspheres from Norton Abrasives. Examples of thermoplastic microspheres include those made of acrylonitrile/vinylidene chloride copolymers such as Expanecel 551DE from Akzo-Nobel, PM6545 from PQ Corporation, and Dualite M6001AE from Pierce & Stevens, and those made from acrylonitrile copolymers such as Dualite M6032AE, M6050AE and MS6070 from Pierce & Stevens. Examples of thermoset plastic microspheres include those made of phenolic resin, CAS #9003-35-4, such as Phenoset BJO-0840 and BJO-0930 from Asia Pacific Microspheres. Especially when using thermoplastic microspheres, it is important to select microspheres that are chemically resistant to the other ingredients of the modeling paste. We have found that combinations of Scotchlite K-1 glass microspheres and Dualite M6050AE acrylonitrile copolymer thermoplastic microspheres provide a useful combination of insolubility in anhydrides, dimensional stability and machinability.

Fillers which are not microspheres may additionally or alternatively be used to modify the rheology, reactivity, density or mechanical properties of the modeling paste or the cured product. Examples of suitable fillers include talc, mica, kaolin, silica, nephalone senite, aluminum oxide, aluminum trihydrate, atomized aluminum, aluminum rods and whiskers, calcium carbonate, micronized polyethylene waxes, wood flour, and graphite; and mixtures thereof. Also useful are fillers which confer thixotropic character on the modeling paste, e.g., fumed silica, fumed titanium dioxide, bentonite clays, carbon black, cellulose fibers and black iron oxides.

Dyes and Pigments

The modeling paste can also contain a dye or a pigment to impart a desired color. Fluorescent and phosphorescent dyes and pigments are particularly useful. If such a dye or pigment is present, voids and flaws in the machine surface (which are otherwise difficult or impossible to detect before painting) can be easily detected by inspection in ultraviolet or black light, and can easily be repaired by hand. In the same way, it is possible to detect and make good imperfections in a layer of primer applied to the machined surface. A combination of fluorescent and other dyes or pigments (e.g. a mixture of red iron oxide and FB-305 Orange) can be used.

Other Ingredients

The composition can contain surfactants and other additives useful in modifying viscosity, thixotropy, adhesion, resin-filled compatibility or de-aeration during vacuum processing. Examples of such ingredients include silanes, silicones, fluoro surfactants, titanates, and zirconates.

EXAMPLES

The invention is illustrated in the following Examples, in which the following abbreviations are used:

Epoxy A is bis(3,4-epoxycyclohexyl)adipate, available from Union Carbide under the tradename ERL-4299.

Epoxy B is 3,4-epoxycyclohexylmethyl-3,4-epoxycyclohexane-carboxylate, available from Union Carbide under the tradename ERL-4221.

Epoxy C is diglycidyl ether of Bisphenol F having an epoxy equivalent weight of about 173, available from Shell Chemical under the tradename Epon 862 or from CVC Specialty Chemicals under the tradename Epalloy 8230.

Epoxy D is diglycidyl ether of Bisphenol A having an epoxy equivalent weight of about 190, available from Shell Chemical under the tradename Epon 828 or from Dow Chemical under the tradename DER 331.

Anhydride A is methyltetrahydrophthalic anhydride available from Lonza under the tradename AC-220-E or from Lindau Chemicals under the tradename Lindride 32.

Anhydride B is dodecenyl succinic anhydride available from Lonza under the tradename DDSA.

Reactant A is a latent imidazole which is a reaction product of an imidazole (16%) and an SCC polymer and which is available from Landec under the tradename Intelimer 7004.

Reactant B is a latent tertiary amine which is a tertiary amine-epoxy adduct having a softening point of 100–130° C. and in the form of particles having a mean size of about 8 microns, and which is available from Ajinomoto under the tradename Ajicure MY-24.

Reactant C is a latent tertiary amine which is a tertiary amine-epoxy adduct containing about 50% of the tertiary amine, having a melting point of about 65° C. and in the form of particles having a mean size of 5–15 microns.

Elastomer A is an elastomer which is in the form of particles having a mean size of 150–200 nanometers, the particles having a core of a butadiene-styrene copolymer and a shell of polymethyl methacrylate, and which is available from Rohm and Haas under the tradename Paraloid EXL-2691.

Elastomer B is an elastomer which is in the form of particles having a mean size of about 250 microns, the particles being composed of high rubber acrylonitrile/butadiene/styrene terpolymer and which is available from General Electric under the tradename Blendex B360.

Filler A is composed of hydrophobic surface-treated fumed silica particles having a surface area of about 100 m$^2$/g and is available from Cabot under the tradename Cabot TS-720.

Filler B is composed of soda lime borosilicate glass microspheres which have a mean particle size of about 55 microns, a specific gravity of about 0.150 and a compressive strength of about 300 psi and is available from 3M under the tradename Scotchlite S-15.

Filler C is composed of polyacrylonitrile microspheres which have a mean particle size of about 95 microns, a specific gravity of about 0.13 and a softening point of about 175° C., and is available from Pierce and Stevens under the tradename Dualite M6032AE.

Filler D is composed of polyacrylonitrile microspheres which have a mean particle size of about 95 microns, a specific gravity of about 0.13 and a softening point of about 175° C., and is available from Pierce and Stevens under the tradename Dualite M6050AE.

Filler E is composed of soda lime borosilicate glass microspheres which have a mean particle size of about 70 microns, a specific gravity of about 0.125 and a compressive strength of about 250 psi, and is available from 3M under the tradename Scotchlite K-1.

Filler F is composed of thermoset phenolic plastic microspheres which have a mean particle size of about 90 microns, a specific gravity of about 0.23 and a compressive strength of about 500 psi, and is available from Asia Pacific Microspheres under the tradename Phenoset BJO-0930.

Pigment A is a fluorescent blue pigment available from United Minerals under the tradename FB-805.

Pigment B is a blue pigment available from Ciba Geigy under the tradename Microlith 4GT.

Pigment C is a fluorescent orange pigment available from United Minerals under the tradename FB-305 Orange.

Pigment D is an iron oxide pigment available from PDI Dispersions under the product number 22-78050.

Dye A is a fluorescent blue dye available from Shannon Luminescence under the tradename T-704.

Surfactant A is a defoaming additive available from Dow Corning under the tradename Antifoam A.

The Table below shows the ingredients and amounts thereof in each of the Examples. The procedures used to mix the ingredients are described below. The specific gravities of the resulting modeling compositions are shown in the Table.

TABLE

|  | Ex. 1 | Ex. 2 | Ex. 3 | Ex. 4 | Ex. 5 | Ex. 6 |
| --- | --- | --- | --- | --- | --- | --- |
| Epoxy A | 28.1 | 36.0 | — | 28.1 | — | — |
| Epoxy B | — | — | 22.0 | — | — | — |
| Epoxy C | — | — | — | — | — | 32.5 |
| Epoxy D | — | — | — | — | 26.9 | — |
| Anhydride A | 29.2 | 29.9 | — | 29.2 | — | 26.0 |
| Anhydride B | — | — | 42.8 | — | 37.7 | — |
| Reactant A | 1.0 | 2.2 | — | 1.0 | — | — |
| Reactant B | — | — | 1.1 | — | — | 1.5 |
| Reactant C | — | — | — | — | 2.7 | — |
| Elastomer A | 20.0 | — | 10.0 | 20.0 | 13.3 | 40.0 |
| Elastomer B | — | 15.0 | — | — | — | — |
| Filler A | 4.0 | — | 6.0 | 4.0 | 1.0 | — |
| Filler B | 16.4 | — | — | — | — | — |
| Filler C | — | 16.5 | — | — | — | — |
| Filler D | — | — | 4.3 | — | 7.0 | — |
| Filler E | — | — | 12.9 | — | 10.5 | — |
| Filler F | — | — | — | 16.5 | — | — |
| Pigment A | 1.0 | — | — | — | — | — |
| Pigment B | — | 0.2 | — | — | — | — |
| Pigment C | — | — | 0.4 | — | 0.4 | — |
| Pigment D | — | — | 0.4 | — | 0.4 | — |
| Dye A | — | — | — | 1.0 | — | — |
| Surfactant A | 0.3 | 0.2 | 0.1 | 0.2 | 0.1 | — |
| Specific Gravity | 0.55 | 0.50 | 0.50 | 0.70 | 0.50 | 1.10 |

Example 1

The epoxy, anhydride and surfactant were added to a dual planetary mixer which had been preheated to 50° C. They were mixed for 5 minutes at 50° C. at medium speed. The pigment was then added and mixing continued at 50° C. and at medium speed until the color was uniform (about 5 minutes). The elastomer and latent catalyst were then added and mixing at 50° C. for 15 minutes at medium speed. The microspheres (Filler B) were then added and mixed at 50° C. for 5 minutes at low speed. The product was treated to remove entrained air by the following procedure. The mixture was scraped from the walls and mixing blade, and mixing was then continued at 50° C. under vacuum [735 mm (29 inch) Hg] and at low speed for 45 minutes. The product was discharged using a ram.

Example 2

The anhydride and the elastomer were blended under high shear at 80° C. The resulting mixture, the epoxy and the surfactant were added to a dual planetary mixer which had been preheated to 50° C., and mixed for 5 minutes at 50° C. at medium speed. The pigment was then added and mixing continued at 50° C. and at medium speed until the color was uniform. The filler (thermoplastic microspheres) and the latent catalyst were then added, and mixing continued at 50° C. for 15 minutes at medium speed. The product was treated to remove entrained air and discharged as in Example 1.

Example 3

The epoxy, anhydride and surfactant were added to a dual planetary mixer which had been preheated to 50° C. They were mixed for 5 minutes at 50° C. at medium speed. The Filler A (fumed silica) was then added, and mixing continued for 10 minutes at 50° C. at medium speed. The pigments were then added, and mixing continued at 50° C. and at medium speed until the color was uniform (about 5 minutes). The elastomer, the Filler D (thermoplastic microspheres) and the latent catalyst were then added, and mixing continued for 15 minutes at 50° C. at medium speed. The Filler E (glass microspheres) was then added, and mixing continued for 5 minutes at 50° C. at low speed. The product was treated to remove entrained air and discharged as in Example 1.

Example 4

The epoxy, anhydride, surfactant and dye were added to a dual planetary mixer which had been preheated to 50° C. They were mixed for 5 minutes at 50° C. at medium speed. The Filler A (fumed silica) was then added, and mixing continued for 10 minutes at 50° C. at medium speed. The elastomer, the catalyst and the Filler F (thermoset microspheres) were then added, and mixing continued for 15 minutes at 50° C. at medium speed. The product was treated to remove entrained air and discharged as in Example 1.

Example 5

The epoxy, anhydride and surfactant were added to a dual planetary mixer which had been preheated to 50° C. They were mixed for 5 minutes at 50° C. at medium speed. The Filler A (fumed silica) was then added, and mixing continued for 10 minutes at 50° C. at medium speed. The pigments were then added, and mixing continued at 50° C. and at medium speed until the color was uniform (about 5 minutes). The elastomer, the latent catalyst, and the filler D (thermoplastic microspheres) were then added, and mixing continued for 15 minutes at 50° C. at medium speed. The Filler E (glass microspheres) was then added, and mixing continued for 5 minutes at 50° C. at low speed. The product was heated to remove entrained air and discharged as in Example 1.

Example 6

The epoxy and anhydride were added to a dual planetary mixer which had been preheated to 50° C. They were mixed for 5 minutes at 50° C. at medium speed. The elastomer and latent catalyst were then added, and mixing continued for 15 minutes at 50° C. at medium speed. The product was treated to remove entrained air and discharged as in Example 1.

Use of the Compositions Produced in the Examples

The compositions produced in the above Examples could be applied to a substrate and then cured, e.g., by heating at 80° C. for 10 hours, or at 100° C. for 2 hours, or at 120° C. for 1 hour. The resulting cured resins could be easily machined. The composition of Example 5, after curing at 80° C. for 16 hours, had the following properties.

| | |
|---|---|
| Tg, ° C., ASTM D-4065 | 78 |
| Coefficient of Thermal Expansion, TMA, $10^{-6} K^{-1}$ | 65 |
| Hardness, Shore D | 55 |
| Flexural Strength, N/mm$^2$, ISO 178 | 27 |
| Compression Strength, N/mm$^2$, ISO 604 | 10 |

What is claimed is:

1. A modeling paste which can be applied to a substrate as a thick layer and then subjected to a treatment which cures the paste so that it forms a machinable layer on the substrate, the modeling paste comprising
    (1) a matrix material which
        (a) provides a continuous phase, and
        (b) comprises at least one precursor which, during said treatment, takes part in a reaction to form a crosslinked polymer;
    (2) a latent material which
        (a) is not part of the continuous phase, and
        (b) comprises an active chemical ingredient which, during said treatment, takes part in the reaction to form the crosslinked polymer, and whose concentration in said reaction is increased by said treatment to an extent such that the modeling paste cures to form a machinable layer;
    (3) a filler; and
    (4) an elastomer which is not part of the continuous phase.

2. A modeling paste according to claim 1 wherein the matrix material comprises precursors for an epoxy resin.

3. A modeling paste according to claim 1 wherein the elastomer is in the form of particles having an average particle size less than 500 microns.

4. A modeling paste according to claim 1 wherein the continuous phase is substantially free from dissolved elastomers.

5. A modeling paste according to claim 1 wherein
    (a) the matrix material comprises a continuous phase comprising an epoxy compound and an anhydride,
    (b) the active chemical ingredient in the latent material comprises a nitrogen-containing compound,
    (c) the filler comprises a filler in the form of microspheres, and
    (d) the elastomer is insoluble in the continuous phase; is in the form of particles having an average particle size of less than 500 microns; and is selected from the group consisting of
        (i) elastomers comprising units derived from butadiene, styrene and acrylonitrile, and
        (ii) particles having a core of an elastomer and an outer shell of another amorphous polymer.

6. A modeling paste according to claim 5 wherein the elastomer is in the form of particles having a core of a butadiene/styrene copolymer and a shell of a polyacrylate.

7. A method of making a model which comprises
    (A) applying to a substrate a thick layer of a modeling paste as claimed in claim 1;
    (B) subjecting the layer of modeling paste to a treatment which cures the paste so that it forms a thick machinable layer on the substrate; and
    (C) machining the cured layer into a desired shape.

8. A modeling paste according to claim 1 which contains a coloring agent selected from fluorescent dyes, fluorescent pigments, phosphorescent dyes and phosphorescent pigments.

9. A modeling paste according to claim 1 wherein said treatment increases the concentration of the active chemical ingredient in the reaction by a factor of at least 500.

10. A modeling paste which can be applied to a substrate as a thick layer and then subjected to a treatment which cures the paste so that it forms a machinable layer on the substrate, the composition comprising
    (1) a matrix material which
        (a) provides a continuous phase, and
        (b) comprises at least one precursor which, during said treatment, take part in a reaction to form a crosslinked polymer;
    (2) distributed in the matrix material, a latent material which (a) comprises
  (i) a polymeric ingredient which comprises a crystalline polymeric moiety having an onset of melting temperature $T_o$ and a peak melting temperature $T_p$ such that $T_p-T_o$ is less than $T_p^{0.7}$, and
  (ii) an active chemical ingredient which, during said treatment, takes part in the reaction of the matrix to form the crosslinked polymer, and
(b) is in the form of solid particles which have an average particle size of 0.1 to 150 microns and which, during said treatment, undergo a physical change which causes the particles to lose their physical integrity, increases the extent to which the matrix material is contacted by the active chemical ingredient, and causes the modeling paste to cure to form a machinable layer.

11. A modeling paste according to claim 10 wherein the active chemical ingredient is a catalyst for said reaction.

12. A modeling paste according to claim 11 wherein the active chemical ingredient comprises a metal.

13. A modeling paste according to claim 10 wherein the active chemical ingredient reacts with said precursor during said treatment and remains chemically bonded in the crosslinked polymer.

14. A modeling paste according to claim 10 wherein (a) the polymeric ingredient and the active chemical ingredient are bonded to each other through a covalent bond having a strength of at least 10 Kcal/mole and (b) said treatment increases the concentration of the active chemical ingredient in the reaction by a factor of at least 1000.

15. A modeling paste according to claim 10 wherein the polymeric ingredient comprises a side chain crystalline polymeric moiety.

16. A modeling paste which can be applied to a substrate as a thick layer and then subjected to a treatment which cures the paste so that it forms a machinable layer on the substrate, the composition comprising
(1) a matrix material which
  (a) provides a continuous phase, and
  (b) comprises an epoxy compound and an anhydride which, during said treatment, take part in a reaction to form the crosslinked epoxy resin;
(2) distributed in the matrix material, a latent material which
  (a) comprises
    (i) a polymeric ingredient which comprises a crystalline polymeric moiety having an onset of melting temperature $T_o$ and a peak melting temperature $T_p$ such that $T_p-T_o$ is less than $T_p^{0.7}$, and
    (ii) an active chemical ingredient which, when in contact with the matrix material, takes part in said reaction, and
  (b) is in the form of solid particles which have an average particle size of 0.1 to 50 microns and which, during said treatment, undergo a physical change which causes the particles to lose their physical integrity, increases the extent to which the matrix material is contacted by the active chemical ingredient, and causes and causes the modeling paste to cure to form a machinable layer.
(3) a filler; and
(4) an elastomer which is insoluble in the continuous phase and which is in the form of particles having an average particle size less than 300 microns.

17. A modeling paste according to claim 16 wherein (a) the polymeric ingredient, comprises a side chain crystalline polymeric moiety, (b) the active chemical ingredient comprises a metal which is a catalyst for said reaction, (c) the polymeric ingredient and the active chemical ingredient are bonded to each other through a covalent bond having a strength of at least 10 Kcal/mole, and (d) said treatment increases the concentration of the active chemical ingredient in the reaction by a factor of at least 1000.

18. A modeling paste according to claim 16 wherein (a) the polymeric ingredient, comprises a side chain crystalline polymeric moiety, (b) the active chemical ingredient reacts with said precursor and remains chemically bonded in the crosslinked epoxy resin, (c) the polymeric ingredient and the active chemical ingredient are bonded to each other through a covalent bond having a strength of at least 10 Kcal/mole, and (d) said treatment increases the concentration of the active chemical ingredient in the reaction by a factor of at least 1000.

19. A modeling paste according to claim 16 which contains a coloring agent selected from fluorescent dyes, fluorescent pigments, phosphorescent dyes and phosphorescent pigments.

20. A method of making a model which comprises
(A) applying to a substrate a thick layer of a modeling paste as claimed in claim 10;
(B) subjecting the modeling paste to a treatment which cures the paste so that it forms a thick machinable layer on the substrate; and
(C) machining the cured layer into a desired shape.

21. A method of making a model which comprises
(A) applying to a substrate a thick layer of a modeling paste as claimed in claim 16;
(B) subjecting the modeling paste to a treatment which cures the paste so that it forms a thick machinable layer on the substrate; and
(C) machining the cured layer into a desired shape.

* * * * *